Sept. 21, 1943.   D. H. FEENSTRA   2,330,039
COUPLING
Filed June 2, 1942

Inventor:
Douwe H. Feenstra,
by *Harry E. Dunham*
His Attorney.

UNITED STATES PATENT OFFICE 2,330,039

COUPLING

Douwe H. Feenstra, Pittsfield, Mass., assignor to General Electric Company, a corporation of New York Application June 2, 1942, Serial No. 445,469

6 Claims. (Cl. 285—114)

My invention relates to a coupling for joining ends of metallic members, and although not limited thereto it has application to a coupling for joining adjacent ends of pipes.

An object of my invention is to provide an improved coupling arrangement for joining ends of metallic members.

Another object of my invention is to provide an improved hermetically sealed joint between ends of pipe members.

A further object of my invention is to provide an improved coupling arrangement for adjacent ends of pipes which coupling arrangement may be quickly fabricated or removed.

A still further object of my invention is to provide an improved arrangement for brazing adjacent ends of pipes to provide an hermetically sealed joint which will minimize the possibility of any of the brazing metal from entering the pipe passage.

Further objects and advantages of my invention will become apparent from the following description referring to the accompanying drawing, and the features of novelty which characterize my invention will be pointed out with particularity in the claims annexed to and forming a part of this specification.

Figure 1:
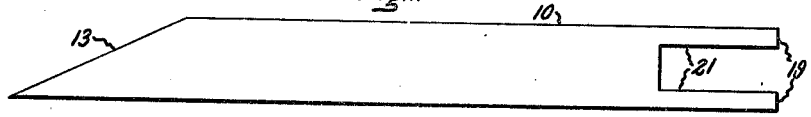
Figure 2:
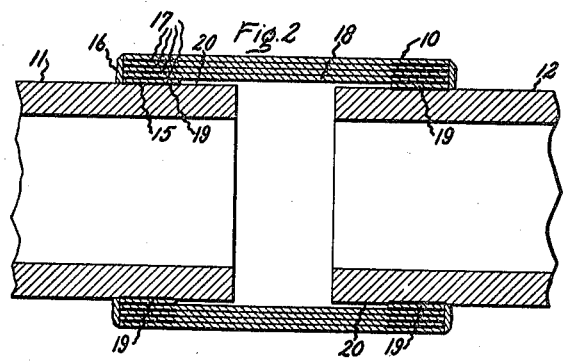
Figure 3:
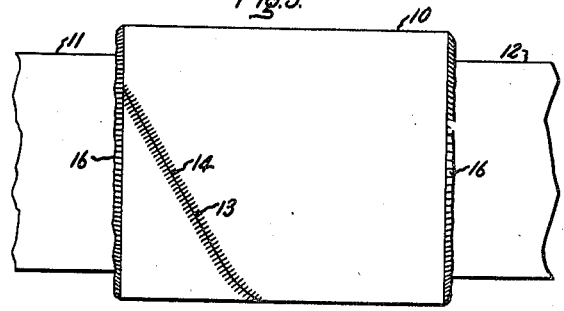
Figure 4:
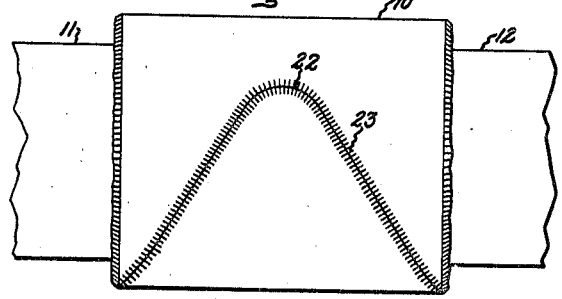

In the drawing Fig. 1 is a side view of a metallic strip which is employed in my coupling arrangement; Fig. 2 is a sectional side elevation of ends of pipes joined together with my improved coupling arrangement; Fig. 3 is a side view of the coupling arrangement illustrated in Fig. 2, and Fig. 4 is a side view of a modification of the coupling arrangement illustrated in Fig. 3.

It is customary to join adjacent ends of metallic pipes by providing a sleeve which telescopes the ends of the pipes and then suitably sealing the adjacent surfaces of the sleeve and pipes in any suitable manner such as by brazing. Clearances with such a conventional structure are, therefore, required between the pipes for slipping the sleeve over the ends of the pipes, and it is usually necessary to have the pipes in alignment so that the sleeve may be slipped on both pipe ends. It is sometimes desirable, however, to provide a tight coupling between adjacent ends of pipes when the pipes are not only out of alignment but when the pipes cannot be adjusted relative to each other for the application of the conventional sleeve member. In the arrangements illustrated in the drawing I have disclosed an improved arrangement for coupling or joining the adjacent ends of pipes which need not be in alignment and which coupling may be applied without moving the ends of the pipes relative to each other. It is to be understood, however, that my invention may also be applied as a coupling for joining the ends of any other suitable metallic members.

My improved pipe coupling arrangement includes a strip of suitable metallic material 10, such as copper which may be easily wrapped around the adjacent ends of metallic members, such as pipe members 11 and 12. The strip 10 should have a suitable width so that it may span the distance between the ends of the pipes and overlap the ends a sufficient distance, as is illustrated in Fig. 2. The strip material 10 may also be of sufficient length so that a number of layers or turns of wrapped material may be provided. It is to be understood, however, that any suitable number of turns may be placed around the adjacent ends of the metallic members to be joined together. The end of the strip which provides the outer turn may have any suitable shape such as being tapered at one side, as is illustrated at 13 in Fig. 3, and this end 13 may be tacked or attached to the adjacent surface of the next succeeding turn in any suitable manner such as by brazing, as is illustrated at 14. The adjacent surfaces of the pipe members 11 and 12 and the inner portion of the strip 10 may be suitably attached together so as to provide a fluid tight joint by providing a joining arrangement which includes a meltable material for joining the adjacent surfaces as is indicated by the numeral 15. This may be accomplished in any suitable manner such as by the use of a brazing alloy. The brazing alloy may also be heated at the ends of the turns of the metallic wrapping material as indicated by the numeral 16 for sealing the ends of the wrapped turns and attaching the ends of the turns to the adjacent surface of the pipes 11 and 12. The turns of the strip material 10 should be wrapped sufficiently tight so as to have a proper clearance between the wrappings so that the particular brazing alloy will creep between the adjacent metallic turns as is illustrated at 17, due to capillary action. Thus a brazing alloy which includes any suitable materials such as copper, silver, zinc, cadmium, will flow between the layers of the strips when the distance between the strips is not in excess of approximately .007 of an inch. By brazing the adjacent turns together and further by brazing the inner turns to the surface of the metallic members such as the pipes 11 and 12, and further by brazing the ends of the turns to each other and to the surface of the pipes at 16 an hermetically sealed construction is provided.

It is sometimes desirable to provide an hermetically sealed construction between pipes which must not be contaminated in any manner by the brazing alloy. Thus, in making joints between pipes which provide a passage for an insulating fluid which is employed in a high voltage electric apparatus, the entrance of any of the brazing alloy into the interior of the pipes will contaminate and seriously affect the dielectric strength of the insulating fluid which is to be carried by the pipes. In order, therefore, to minimize the possibility of entrance of any of the meltable material which is used to form the joint, I space the inner turn 18 which spans between the adjacent ends of the pipes 11 and 12 a suitable distance from the pipe surfaces so that the meltable metal which is used in the joining operation cannot flow between the adjacent surfaces of the turn 18 and the pipes 11 and 12 by capillary action. Thus, metallic portions 19 are provided so as to provide a space 20 between the turn 18 and the pipe surfaces which space will be sufficiently large so that there will be no capillary action to move the metal to the ends of the pipes and into the passages thereof. The arrangement 19 may be accomplished in any suitable manner, such as by providing a cutout portion 21 at the end of the strip 10 which forms the inner portion when it is wrapped as shown in Fig. 2. The remaining portions therefore provide tongues 19 which will have sufficient length so as to be equal to the distance around the periphery of the pipe. The width of the slot 21 will also be sufficient so that the tongues 19 will be spaced from the adjacent edges of the pipes which are to be joined together. Thus when employing a strip material which has a thickness of about .03 of an inch, the space 20 will thereby have a width of the same distance, which distance is sufficiently great so as to minimize any movement of the meltable metallic material through the space 20 by capillary action. Thus the possibility of contaminating the pipe passages by any of the brazing alloy is minimized.

In Fig. 4 I have illustrated a similar joint with the outer ends having a V-shaped construction 22 which is also attached to the adjacent turn by a brazing operation indicated by the numeral 23.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. In combination, a pair of pipes to be joined, a strip of metal having a plurality of turns wrapped around the adjacent ends of the pipes, means for joining the adjacent wrappings of the metallic strip together and to the pipe ends to provide a substantially fluid tight joint between the pipes, and means spacing the inner turn from the adjacent surface of the pipes so as to minimize the flow of said joining means along the surface of the pipes to the ends thereof due to capillary action.

2. A coupling joining adjacent ends of pipes including a strip of metal having a plurality of turns wrapped around the adjacent ends of the pipes to be joined, a brazing alloy joining said turns together and to the adjacent surface of the pipes, and means integral with said metal strip for spacing the inner turn from the surface of the pipes a distance about equal to the thickness of the metal strip so as to minimize the flow of said brazing alloy along the surface of the pipes to the ends thereof and into the pipes.

3. A coupling joining adjacent ends of pipes including a strip of metal having a plurality of turns wrapped around the adjacent ends of the pipes to be joined, a brazing alloy joining said turns with the adjacent surface of the pipes, and means spacing said turns from the surface of the pipes adjacent the ends thereof a sufficient amount whereby brazing alloy is prevented from flowing along the surface of the pipes to the ends thereof due to capillary action.

4. A coupling joining adjacent ends of metallic members together including a plurality of layers of metallic strip material bridging between and overlapping the adjacent ends of the metallic members, means including meltable metal joining said strip metal to the metallic members, said meltable metal joining said layers together, and means spacing said inner layer which spans the adjacent ends of the metallic members from the surface of the members adjacent the ends thereof a sufficient amount whereby meltable metal is prevented from flowing along the surface of the members to the ends thereof due to capillary action.

5. A coupling joining adjacent ends of pipes including a strip of metal having a plurality of turns wrapped around the adjacent ends of the pipes and bridging between and overlapping the ends of the pipes, means including a meltable metal joining said turns to the adjacent surface of the pipes and joining said layers together, and means spacing said inner turn which spans the adjacent ends of the pipes from the surface of the pipes a sufficient amount so as to prevent flow of said meltable metal along the surface of the pipes to the interior thereof due to capillary action.

6. A coupling joining adjacent ends of pipes including a strip of metal having a plurality of turns wrapped around the adjacent ends of the pipes and bridging between and overlapping the ends of the pipes, means including a meltable metal joining said turns to the adjacent surface of the pipes and joining said layers together, the portion of said strip forming the first turn having a slot wider than the distance between the adjacent ends of the pipes for spacing the inner turn which spans the adjacent ends of the pipes from the pipe surfaces a distance equal to the thickness of said strip.

DOUWE H. FEENSTRA.